US012775315B2

(12) United States Patent
Mundt et al.

(10) Patent No.: US 12,775,315 B2
(45) Date of Patent: Oct. 27, 2026

(54) FORM FACTOR ADAPTER FOR INFORMATION HANDLING SYSTEM ADD-IN CARDS

(71) Applicant: Dell Products L.P., Round Rock, TX (US)

(72) Inventors: Kevin Warren Mundt, Austin, TX (US); William Emmett Lynn, Puyallup, WA (US)

(73) Assignee: Dell Products L.P., Round Rock, TX (US)

( * ) Notice: Subject to any disclaimer, the term of this patent is extended or adjusted under 35 U.S.C. 154(b) by 172 days.

(21) Appl. No.: 18/312,082

(22) Filed: May 4, 2023

(65) Prior Publication Data

US 2024/0370066 A1 Nov. 7, 2024

(51) Int. Cl.
*G06F 1/186* (2026.01)

(52) U.S. Cl.
CPC .................................... *G06F 1/186* (2013.01)

(58) Field of Classification Search
CPC ................................. G06F 1/187; G06F 1/181
See application file for complete search history.

(56) References Cited

U.S. PATENT DOCUMENTS 10,264,701 B1 * 4/2019 Norton ................. H05K 7/1424
2022/0121251 A1 * 4/2022 Chang ..................... G06F 1/187

* cited by examiner

*Primary Examiner* — James Wu
(74) *Attorney, Agent, or Firm* — Jackson Walker L.L.P.

(57) ABSTRACT

Add-in card (AIC) adapters or sleeve adapters, suitable for use with information handling system chassis defining one or more AIC bays suitable for receiving a first AIC form factor, convert the bay into two or more sleeve-defined bays. Each sleeve bay is suitable for receiving a different and typically smaller form factor. For example, a chassis with an Enterprise and Data Center Standard Form Factor (EDSFF) E5 double wide bay may include a sleeve adapter defining two E5 single wide sleeve bays, each of which is suitable for receiving a corresponding E5 single wide AIC form factor. In another example, a sleeve adapter may be configured to convert an E5 double wide bay into one or more sleeve bays configured for a legacy CEM form factor. Sleeve adapters may route a subset of PCIe data lanes associated with a bay to each sleeve bay defined by the sleeve adapter.

18 Claims, 8 Drawing Sheets

FORM FACTOR ADAPTER FOR INFORMATION HANDLING SYSTEM ADD-IN CARDS

TECHNICAL FIELD

The present disclosure pertains to information handling system and, more specifically, information handling system features for accommodating add-in cards (AICs).

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Many server class and other types of information handling systems include one or more AICs that provide peripheral devices including, as example, network interface controllers (NICs), host bus adapters (HBAs), data processing units (DPUs), etc. and graphics processing units (GPUS). AICs generally include a printed circuit board (PCB), which is populated with various components and sized in accordance with a standardized form factor and a commercially significant percentage of AICs are designed for use with a Peripheral Component Interconnect express (PCIe) expansion bus.

FIG. 1 depicts PCIe-compliant AICs including card electromechanical (CEM) AICs 101 and EDSFF AICs 102. For the sake of comparison, the AICs depicted in FIG. 1 are approximately, if not precisely, to scale. The CEM AICs 101 illustrated in FIG. 1 represent four different CEM form factors including a low profile form factor 101-1, a full height half length (FHHL) form factor 101-2, a full height, three-quarter length (FH3/4L) form factor 101-3, and a full height, full length (FHFL) form factor 101-4. The EDSFF AICs 102 of FIG. 1 illustrate a proposed, but not yet finalized version of an E5 form factor 102-1, an Open Compute Project (OCP) form factor 102-2, and an E3 long form factor 102-3.

While the use of numerous CEM form factors beneficially accommodates a variety of system configurations and solutions, it has also undesirably increased chassis complexity and differentiation. FIG. 2, which depicts six distinct chassis configurations 201-1 through 201-6 for a 2U rack mount server for a single CPU platform such as, captures a portion of this complexity at least because each chassis 201 depicted in FIG. 2 accommodates a different combination of CEM AICs. This complexity is only likely to increase as the various EDSFF form factors become increasingly prevalent.

SUMMARY

The chassis complexity described above is addressed by AIC adapters, referred to herein as sleeve adapters, suitable for use in conjunction with disclosed information handling systems chassis wherein a chassis defines one or more larger AIC bays suitable for receiving a larger AIC form factor and each sleeve adapter converts the AIC bay into two or more sleeve-defined bays, referred to herein simply as sleeve bays, each of which is suitable for receiving a different and typically smaller AIC form factor. As an example, a system chassis may include or define one or more E5 double wide bays wherein at least one of the E5 double wide bays includes a sleeve adapter defining two E5 single wide sleeve bays, each of which is suitable for receiving a corresponding E5 single wide AIC form factor. In another example, a sleeve adapter may be configured to convert an E5 double wide bay into two or more CEM bays, each of which accommodates a corresponding CEM AIC form factor. As an example, the E5 double wide bay of the previous example may receive a sleeve adapter configured to convert the bay into two low profile (LP) CEM sleeve bays, each of which is suitable for receiving an LP CEM AIC.

Each chassis bay may be suitable for receiving a first plurality of data I/O signals and each sleeve adapter may be configured to route subsets of the first plurality of data signals to each of the two or more sleeve bays. If a chassis bay is configured to support, as an example, 32 PCIe data lanes, a sleeve adapter defining N sleeve bays may be configured to route 32/N data channels to each of the N sleeve bays. For the previously mentioned sleeve adapter defining two sleeve bays, the sleeve adapter may be configured to route 16 lanes to each sleeve bay. For a sleeve adapter defining four sleeve bays, the sleeve adapter may route eight data lanes to each sleeve bay.

In another illustrative example, the chassis bay may be implemented to accommodate an AIC with an EDSFF form factor and the sleeve adapter may be configured to accommodate one or more AICs having a CEM form factor. Examples of these such embodiments may include an E5 double wide chassis bay and a sleeve adapter defining two CEM low profile (LP) AICs or a sleeve adapter defining at least one and possibly multiple CEM FHHL AICs.

Thus, disclosed information handling chassis define one or more AIC bays including at least one AIC bay configured to accommodate a first AIC form factor. Disclosed systems may further include a sleeve adapter received in the first AIC bay, defining two or more sleeve bays including a first sleeve bay configured to accommodate a second form factor AIC, i.e., an AIC with a second type of form factor, different than the first form factor. Each sleeve adapter may include a sleeve adapter shell and a routing means to route signals from a connector for the first type of form factor to appropriate signals on a connector for the second type of AIC form factor.

As suggested in at least some of the preceding examples, the first form factor may an E5 double wide (2T) form factor and the second form factor standard may be any of the following form factors: an EDSFF E5 single wide (1T) form factor, an EDSFF E3 form factor, an EDSFF E1 or OCP form factor, and a CEM form factor. Thus, numerous sleeve adapters can be created wherein each sleeve adapter allows conversion of a larger bay and its larger PCIe lane count for other EDSFF family form factor or for at least some of the smaller legacy CEM AICs.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
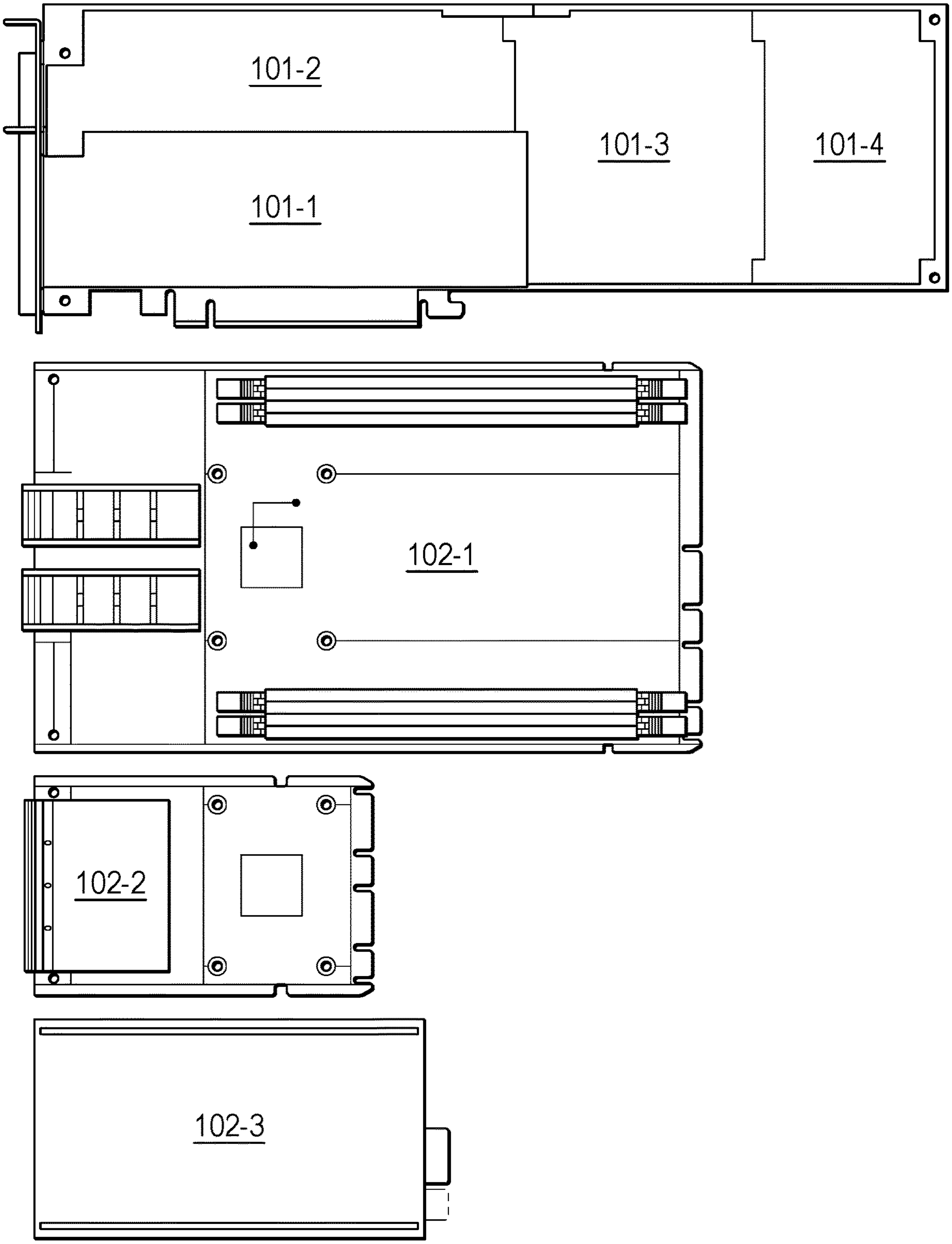
FIG. 1 illustrates form factors for various CEM and EDSFF AICs.
Figure 2:
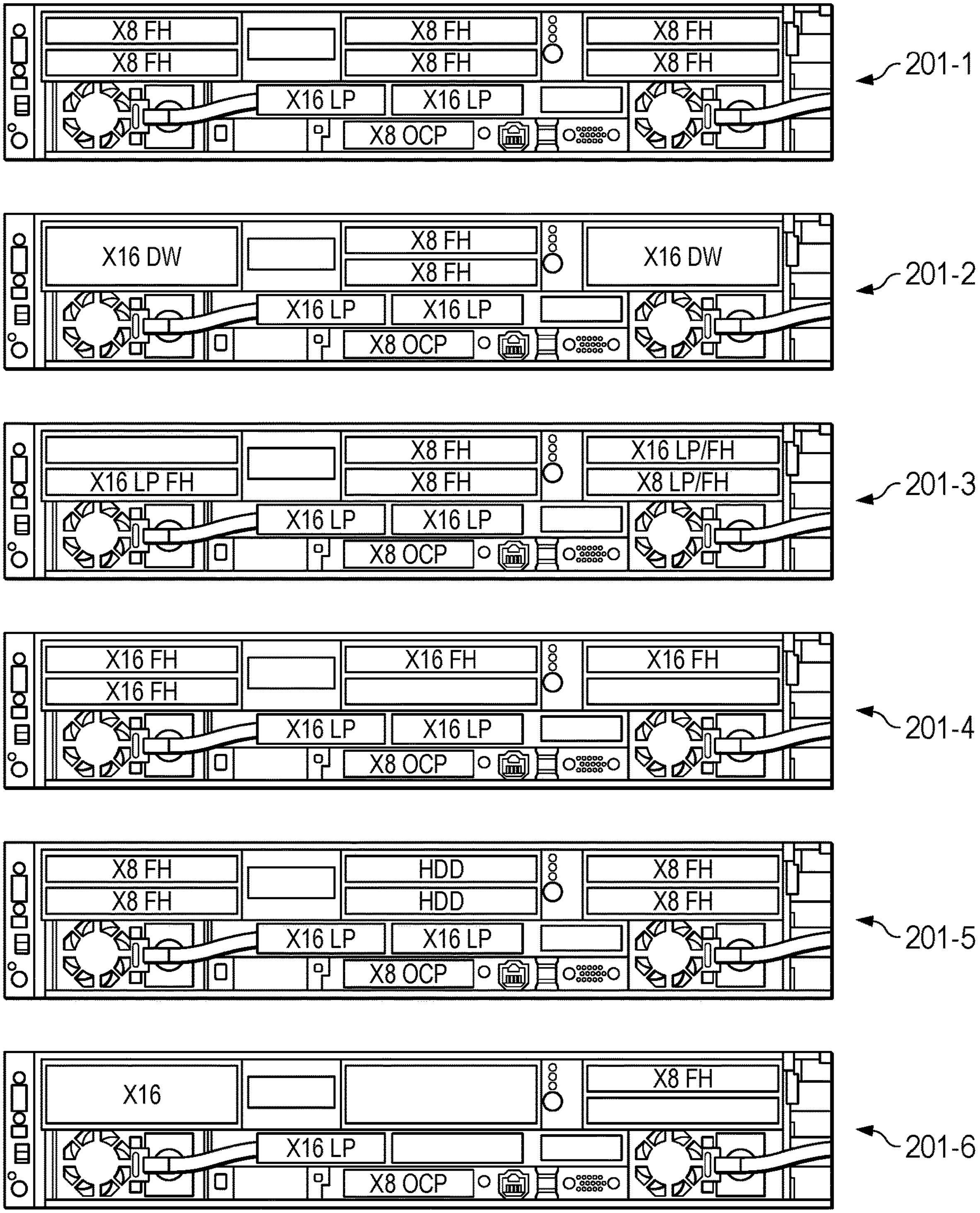
FIG. 2 illustrates a multiplicity of 2U chassis configurations implemented to accommodate various combinations of CEM AIC bays.

Exemplary embodiments and their advantages are best understood by reference to FIGS. 1-11, wherein like numbers are used to indicate like and corresponding parts unless expressly indicated otherwise.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU"), microcontroller, or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more buses operable to transmit communication between the various hardware components.

Additionally, an information handling system may include firmware for controlling and/or communicating with, for example, hard drives, network circuitry, memory devices, I/O devices, and other peripheral devices. For example, the hypervisor and/or other components may comprise firmware. As used in this disclosure, firmware includes software embedded in an information handling system component used to perform predefined tasks. Firmware is commonly stored in non-volatile memory, or memory that does not lose stored data upon the loss of power. In certain embodiments, firmware associated with an information handling system component is stored in non-volatile memory that is accessible to one or more information handling system components. In the same or alternative embodiments, firmware associated with an information handling system component is stored in non-volatile memory that is dedicated to and comprises part of that component.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

For the purposes of this disclosure, information handling resources may broadly refer to any component system, device or apparatus of an information handling system, including without limitation processors, service processors, basic input/output systems (BIOSs), buses, memories, I/O devices and/or interfaces, storage resources, network interfaces, motherboards, and/or any other components and/or elements of an information handling system.

In the following description, details are set forth by way of example to facilitate discussion of the disclosed subject matter. It should be apparent to a person of ordinary skill in the field, however, that the disclosed embodiments are exemplary and not exhaustive of all possible embodiments.

Throughout this disclosure, a hyphenated form of a reference numeral refers to a specific instance of an element and the un-hyphenated form of the reference numeral refers to the element generically. Thus, for example, "device 12-1" refers to an instance of a device class, which may be referred to collectively as "devices 12" and any one of which may be referred to generically as "a device 12".

As used herein, when two or more elements are referred to as "coupled" to one another, such term indicates that such two or more elements are in electronic communication, mechanical communication, including thermal and fluidic communication, thermal, communication or mechanical communication, as applicable, whether connected indirectly or directly, with or without intervening elements.

Figure 3:
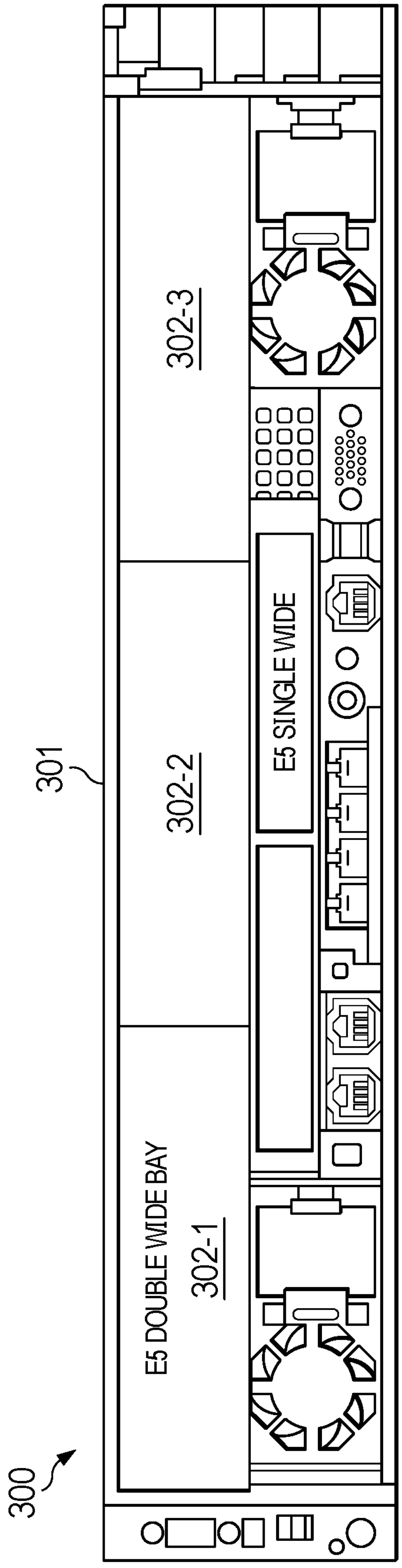
FIG. 3 illustrates an information handling system chassis, in accordance with disclosed subject matter, including three empty E5 double wide bays.
Figure 4:
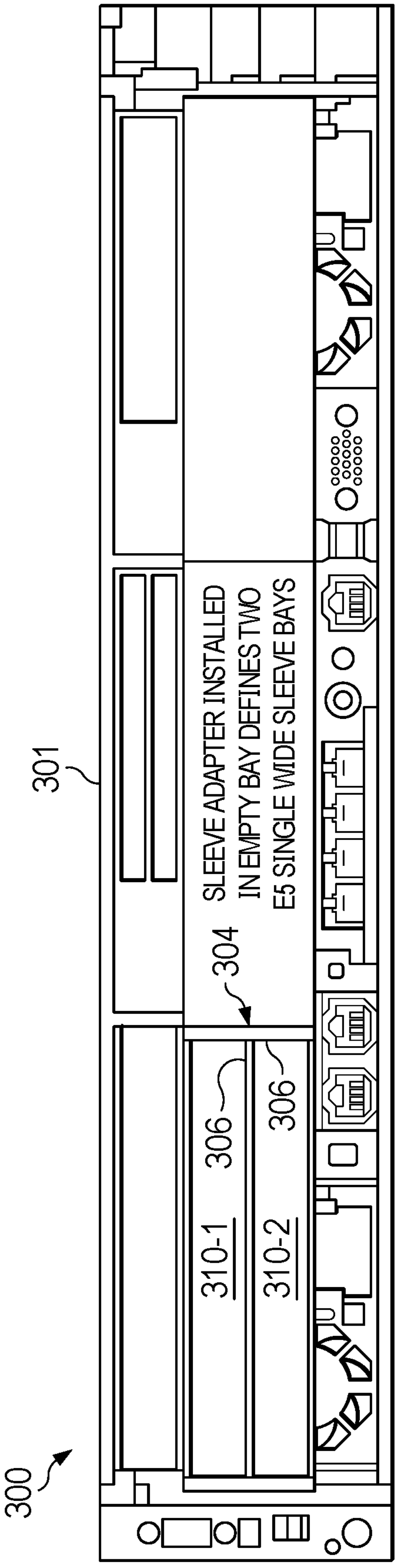
FIG. 4 illustrates the system of FIG. 3 after installation of a sleeve adapter in one of the E5 bays to define two E5 single wide sleeve bays in accordance with disclosed subject matter.
Figure 5:
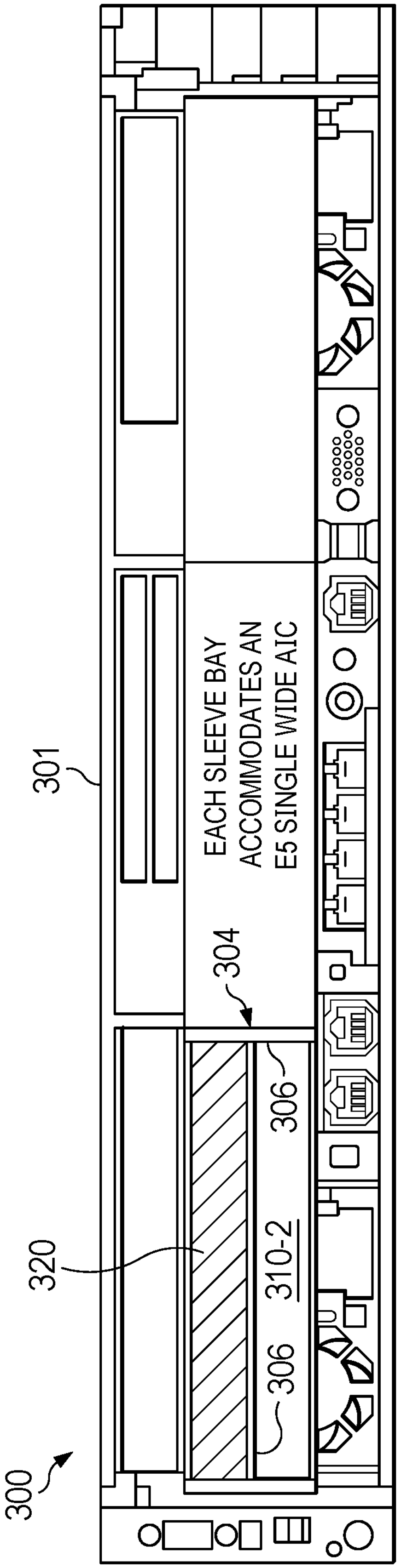
FIG. 5 illustrates the system of FIG. 4 after installation of an E5 single wide AIC in one of the E5 single wide sleeve bays.

Referring now to the drawings, FIGS. 3, 4, and 5 depict an exemplary sequence for implementing disclosed features for mitigating chassis complexity. As depicted in FIG. 3, a 2U rack mount server 300 includes a chassis 301 defining three EDSFF E5 double wide bays 302-1, 302-2, and 302-3, each of which is empty or unpopulated. Although FIG. 3 illustrates the specific example of E5 double wide bay bays 302, disclosed subject matter is applicable to chassis bays other than E5 bays. Similarly, although FIG. 3 illustrates a 2U rack mount server 300, disclosed subject matter is applicable to 1U, 4U and other suitable server configurations.

FIG. 4 illustrates a sleeve adapter 304 inserted or otherwise installed in the first empty bay (302-1) of the rack mount server illustrated in FIG. 3. The illustrated sleeve adapter 304 includes a sleeve shell 306, defining sleeve-adapted bays, referred to herein simply as sleeve bays 310, of which two are shown in FIG. 4, i.e., sleeve bays 310-1 and 310-2. Each sleeve bay 310 is configured to be suitable for receiving an AIC form factor other than the AIC form factor associated with the empty chassis bays 302 depicted in FIG. 3. Continuing with the example of EDSFF E5 double wide bays 302, sleeve bays 310 defined by sleeve adapter 304 may comprise E5 single wide sleeve adapters, i.e., sleeve adapters configured to receive E5 single wide AICs. Again, however, although the drawings illustrate specific implementations, disclosed subject matter is not limited to the depicted implementations and it will be readily appreciated by those of ordinary skill in the field of server chassis design that sleeve bays 310 may be sized and otherwise configured to accommodate form factors other than the E5 single wide form factors and that sleeve adapter 304 may define more than the two sleeve bays 310 illustrated in FIG. 4.

FIG. 5 depicts the illustrated 2U rack server 300 after an E5 single wide device 320 has been inserted or otherwise installed into the E5 single wide sleeve bay 310-1 of FIG. 4. Although FIG. 5 illustrates one of the available sleeve bays (310-2) empty and one of the sleeve bays populated with a device implemented on suitable form factor, disclosed subject matter encompasses a readily imaginable implementation and configuration in which both of the sleeve bays 310 of FIG. 4 have been populated with devices of a suitable form factor.

Embodiments of disclosed subject matter may provide a plurality of data signals such as 8, 16, or 32 PCIe data lanes to each chassis bay 302 and, in at least some embodiments, the previously referenced wiring and circuitry means within each sleeve adapter 304 may route a subset of the chassis bay's data lanes to the corresponding sleeve bay 310. In the case of a chassis bay 302 that receives 32 PCIe data lanes and a sleeve adapter 304 that defines two sleeve bays 310, sleeve adapter 304 may include data channel routing means for routing 16 of the 32 data lanes to the first sleeve bay 310-1 and the remaining 16 data lanes to the second sleeve bay 310-2. For implementations (not depicted in the figures) of sleeve adapters 304 that might define four or eight sleeve bays, each sleeve adapter may include data channel routing means for routing distinct subsets of eight or four data lanes to each sleeve bay 310.

Thus, FIG. 3 through FIG. 5 illustrate a single 2U rack mount server chassis 301 deployed to accommodate at least two configurations including a first configuration in which one of the server's AIC bays is populated with a single E5 double wide x32 AIC form factor device and further including a second configuration in which the same chassis bay is provisioned with an adapter sleeve defining two sleeve bays each of which maybe populated with two x16 E5 single wide form factor devices.

Figure 6:
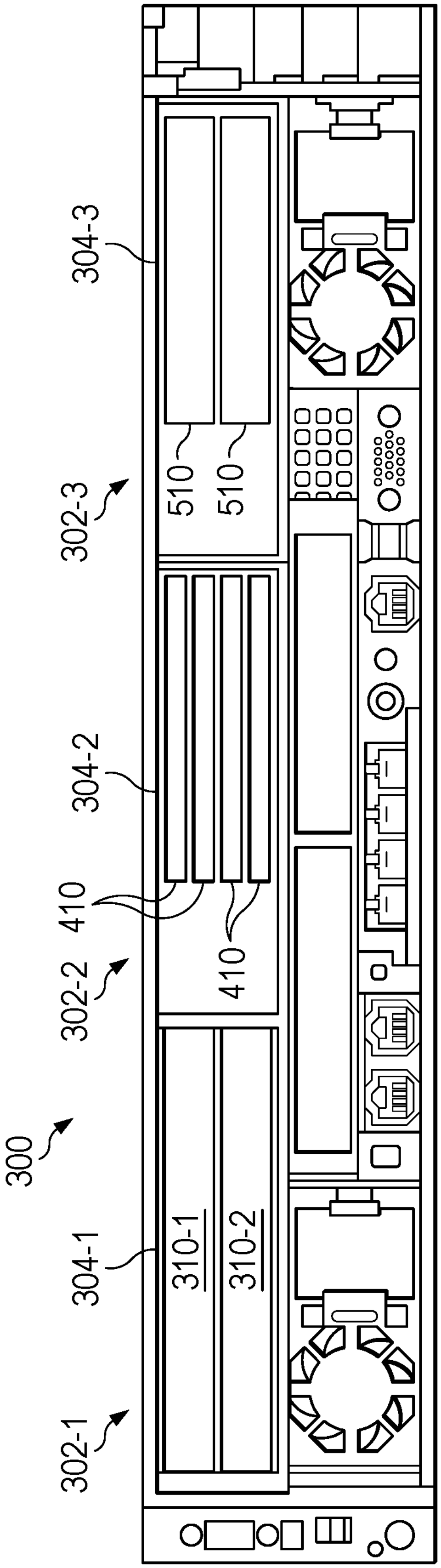
FIG. 6 illustrates an exemplary configuration of the system of FIG. 3.

Referring now to FIG. 6, another configuration of the rack mount server 300 of FIGS. 3-5 is depicted to illustrate desirable configuration flexibility enabled by disclosed sleeve adapter subject matter. As depicted in FIG. 6, the three E5 double wide bays 302 of the illustrated server 300 have each been provisioned with a different type of sleeve adapter 304. Specifically, the first bay 302-1 of server 300, like the first bay 302-1 depicted in FIG. 5, is depicted provisioned with a sleeve adapter 304 defining a pair of E5 single wide sleeve bays 310 configured to accommodate a corresponding pair of E5 single wide AIC form factor devices, which are omitted from FIG. 6 for greater clarity. The second bay 302-2 of server 300 is depicted provisioned with a sleeve adapter 304-2 defining four sleeve bays 410 each of which is configured to accommodate a corresponding E3 thin form factor AIC, again not shown in FIG. 6, while the third bay 302-3 of server 300 is illustrated provisioned with a third sleeve adapter 304-3 defining two E3 thick sleeve bays 510, each of which is suitable for accommodating an E3 thick AIC form factor device. Thus, a single type of chassis bay 302 is leveraged to accommodate three different configurations of AICs and, in each configuration, the chassis bay's data lanes are distributed among each of the sleeve bays 310, 410, 510 defined by the applicable sleeve adapters 304-1, 304-2 and 304-3.

The server configurations illustrated in FIGS. 3, 4, 5, and 6 all feature E5 double wide chassis bays and sleeve bays configured to accommodate another EDSFF form factor. In other embodiments, the chassis bays 302 may accommodate form factors from one family of form factors while the sleeve bays defined by the sleeve adapters may accommodate AIC form factors from a different family. In at least one such embodiment in which the E5 double wide chassis bays depicted in FIG. 3-6 are again used, the sleeve adapters 304 may include one or more sleeve adapters defining one or more sleeve bays configured to accommodate one or more types of legacy AICs including legacy CEM AICs such as LP CEM AICs and FHHL CEM AICs. Still other configurations may accommodate customer or non-standard configurations which, for purposes of this disclosure may refer to implementations that accommodate forms factors other than CEM and EDSFF form factors.

Figure 7:
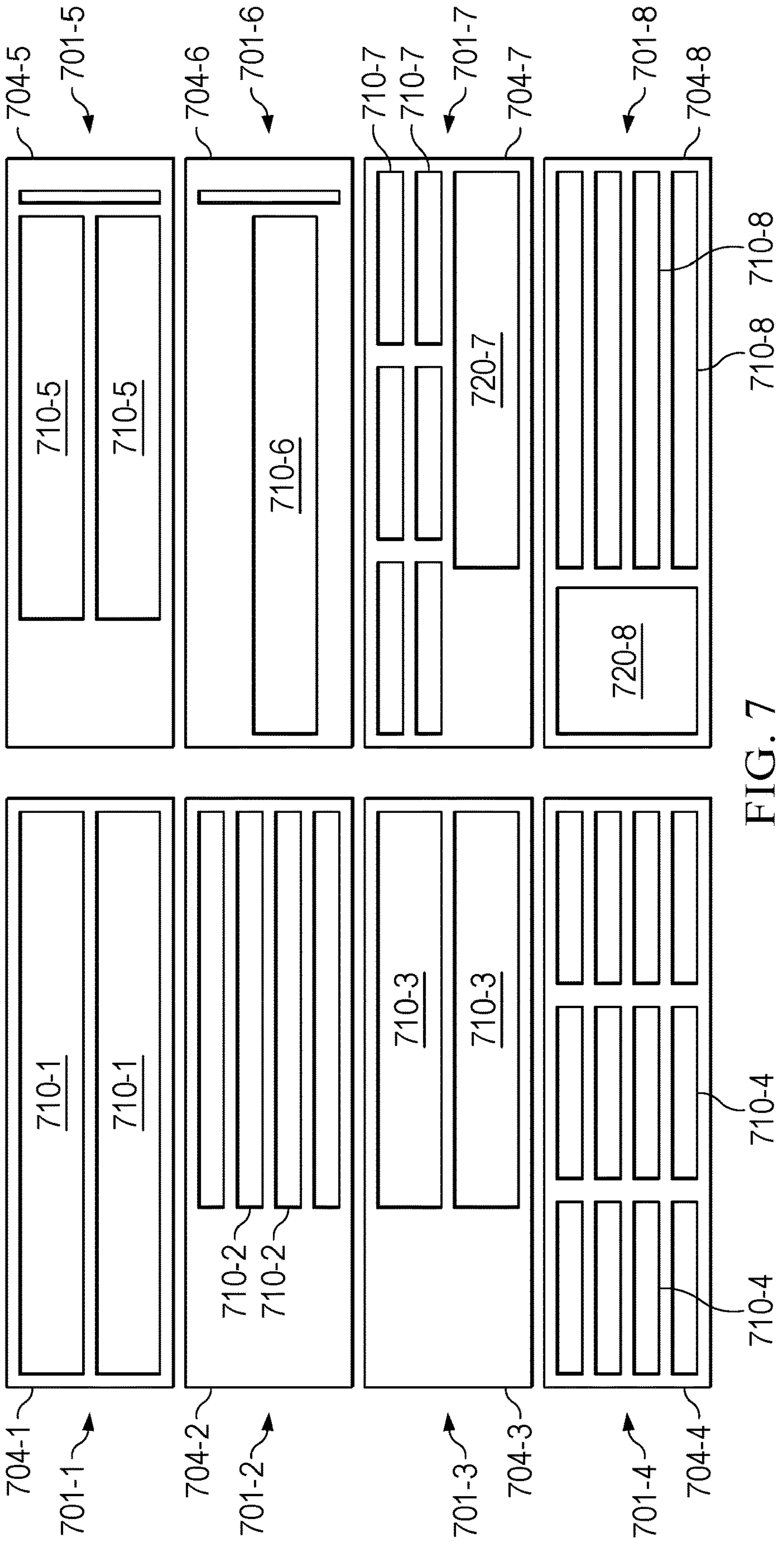
FIG. 7 illustrates at least some of the possible AIC configurations possible for the system of FIG. 3.

Turning now to FIG. 7, eight different AIC configurations of a single double wide E5 chassis bay, such as the chassis bays 302 of FIG. 3, are depicted to illustrate flexibility of disclosed sleeve adapters in accommodating cross-family configurations in which, for example, a sleeve adapter enables an EDSFF chassis bay to accept and accommodate a non-EDSFF form factor AIC as well as custom configurations in which, for example, an EDSFF bay accommodates one or more devices that are not implemented with a form factor that is neither an EDSFF form factor nor a CEM form factor.

Specifically, the illustrated AIC configurations for the exemplary E5 double wide a double wide bay 302 include: a first configuration 701-1 in which an adapter sleeve 704-1 defines two E5 single wide sleeve bays 710-1, a second configuration 701-2 in which an adapter sleeve 704-2 defines four E3 thin sleeve bays 710-2, a third configuration 701-3 in which an adapter sleeve 704-3 defines two E3 thick sleeve bays 710-3, a fourth configuration 701-4 in which an adapter sleeve 704-4 defines twelve E1 sleeve bays 710-4, a fifth configuration 701-5 in which an adapter sleeve 704-5 defines two LP CEM sleeve bays 710-5, a sixth configuration 701-6 in which an adapter sleeve 704-6 defines at least one and depending upon final dimensions of the E5 form factor, two FHHL CEM sleeve bays 710-6, a seventh configuration 701-7 in which an adapter sleeve adapter 704-7 defines six E1 sleeve bays 710-7 and an additional sleeve bay 720-7 for a redundant array of independent disks (RAID) controller, and an eighth configuration 701-8 in which an adapter sleeve 704-8 defines four E3 thin sleeve bays 710-8 and an additional sleeve bay 720-8 for a boot optimized RAID controller such as a boot optimized storage solution (BOSS) RAID solution from Dell Technologies.

Figure 8:
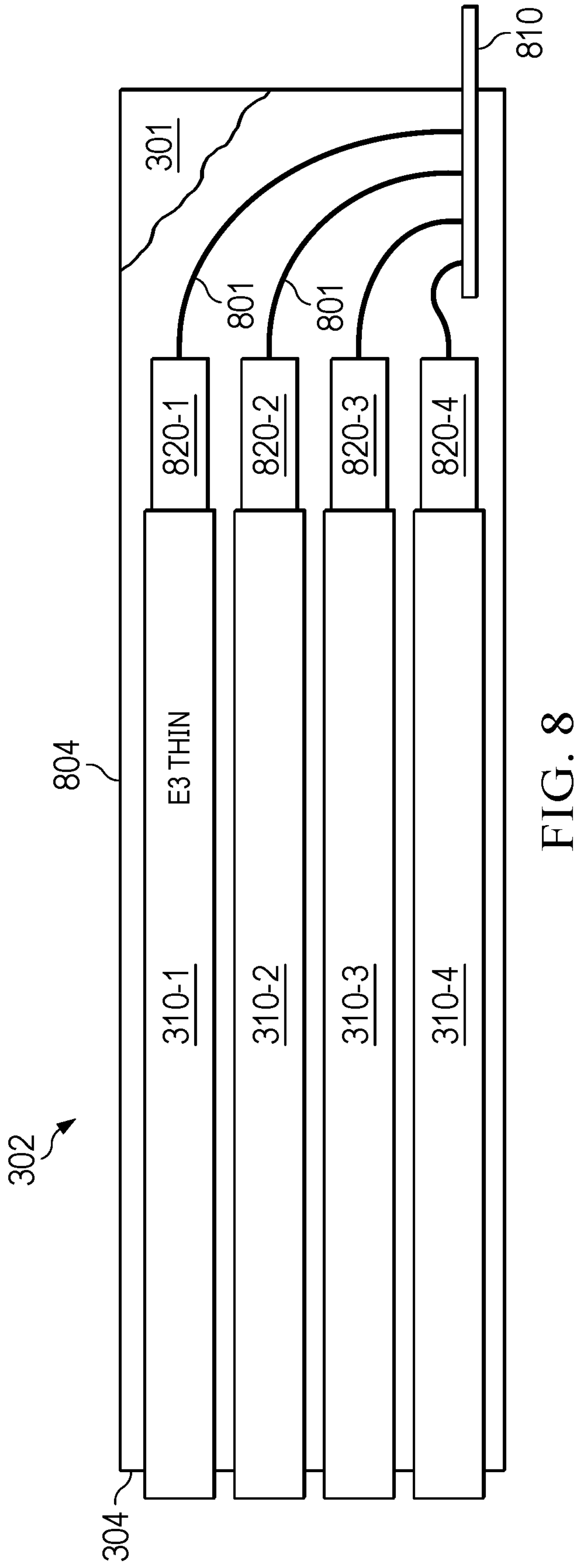
FIG. 8 illustrates detail of a first exemplary sleeve adapter.

Turning now to FIG. 8, a side elevation view of an exemplary chassis bay 302 and a sleeve adapter 304 defining four E3 thin sleeve bays 310-1 through 310-4 is presented. The sleeve adapter 304 of FIG. 8 includes a sleeve adapter frame 804, defining the physical surfaces of sleeve bays 310, and connection means 801 for routing signals provided to chassis bay 302 to each AICs received in a sleeve bay 310. Sleeve adapter frame 804 may be comprised of sheet metal or another suitable material.

Chassis bay 302 is illustrated in FIG. 8 with a side portion of chassis 301 removed to reveal signal routing means 801 implemented, in FIG. 8, with electrically conductive cables connecting contacts, including data lane contacts, of an EDSFF E5 connector 810 with contacts, including data lane contacts, of EDSFF E3 thin connectors 820 within each E3 thin sleeve bay 310.

Figure 9:
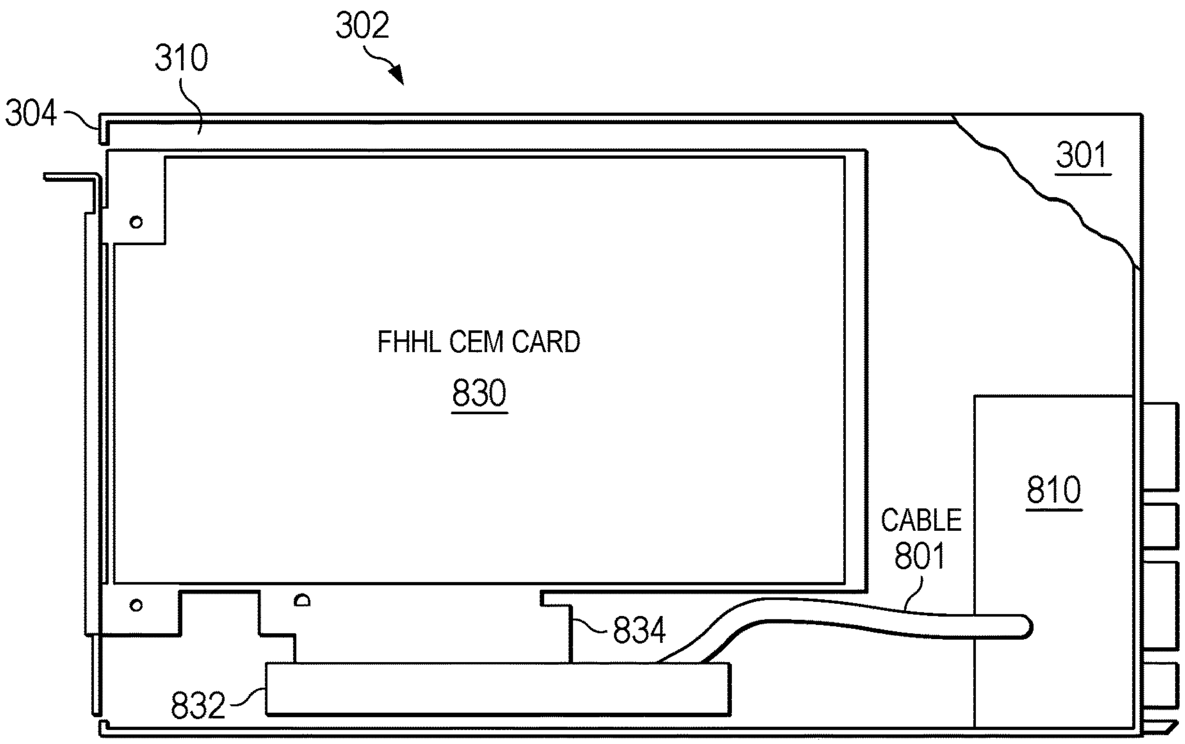
FIG. 9 illustrates detail of a second exemplary sleeve adapter.

FIG. 9 illustrates a plan view of an exemplary chassis bay 302 and a sleeve adapter 304 defining an FHHL CEM sleeve bay 310 suitable for receiving an FHHL CEM AIC 830 and a corresponding riser card 832 for receiving a connector edge 834 of FHHL CEM card 830. The illustrated sleeve adapter 304 includes routing means 801 comprising one or more electrically conductive cables connecting contacts, including data lane contacts, of the EDSFF E5 connector 810 with suitable corresponding contacts of the riser card 832. As depicted in FIG. 9, the illustrated sleeve adapter includes routing means 801 connecting the FHHL CEM riser card 832 to the EDSFF connector 810 for the chassis bank.

Figure 10:
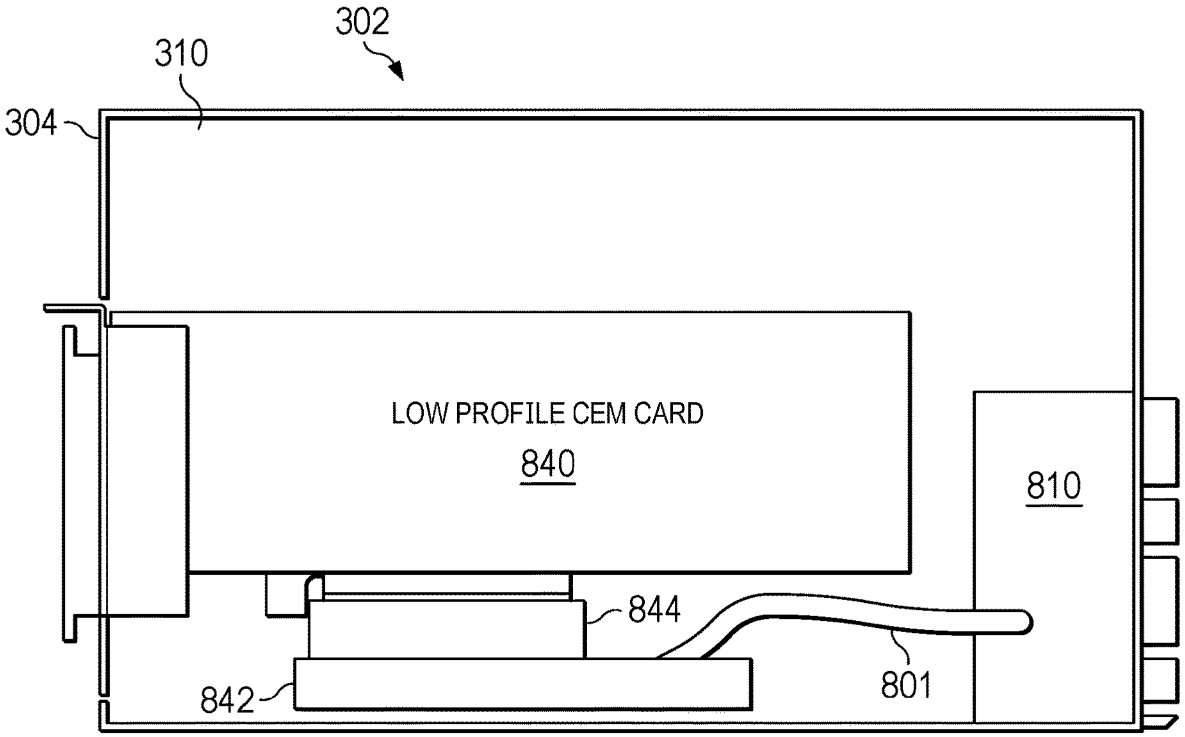
FIG. 10 illustrates detail for a third exemplary sleeve adapter.

FIG. 10, similar to FIG. 9, illustrates an adapter sleeve 304 defining a sleeve bay 310 suitable for an LP CEM AIC 840 and a corresponding riser card 842 for receiving a connector edge 844 of LP CEM card 840. As depicted in FIG. 10, the illustrated sleeve adapter includes routing means 801 connecting LP CEM riser card 842 to the E5 EDSFF connector 810.

Thus, in each of the sleeve adapters illustrated in FIGS. 8, 9, and 10, the depicted sleeve adapters include sleeve adapter shells providing the physical outline of the corresponding sleeve bays, as well as routing means for coupling the signals provided to the chassis bay to each of the sleeve adapter connectors.

Figure 11:
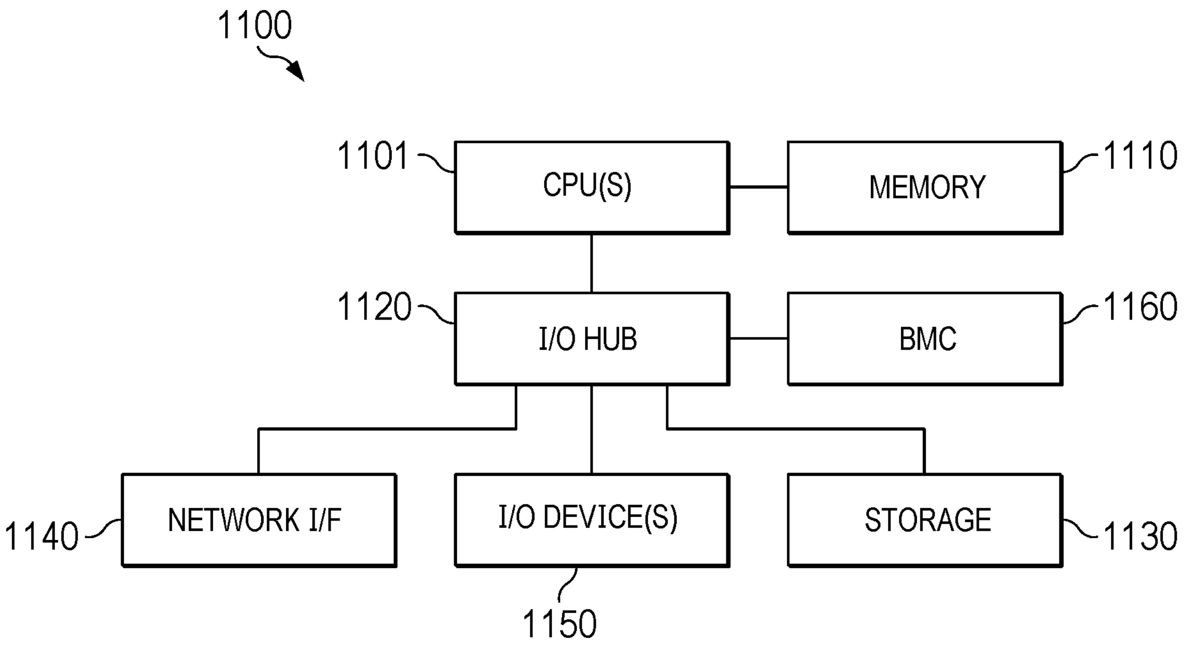
FIG. 11 illustrates selected elements of an exemplary information handling system.

Referring now to FIG. 11, any one or more of the elements illustrated in FIG. 1 through FIG. 10 may be implemented as or within an information handling system exemplified by the information handling system 1100 illustrated in FIG. 11. The illustrated information handling system includes one or more general purpose processors or central processing units (CPUs) 1101 communicatively coupled to a memory resource 1110 and to an input/output hub 1120 to which various I/O resources and/or components are communicatively coupled. The I/O resources explicitly depicted in FIG. 11 include a network interface 1140, commonly referred to as a NIC (network interface card), storage resources 1130, and additional I/O devices, components, or resources 1150 including as non-limiting examples, keyboards, mice, displays, printers, speakers, microphones, etc. The illustrated information handling system 1100 includes a baseboard management controller (BMC) 1160 providing, among other features and services, an out-of-band management resource which may be coupled to a management server (not depicted). In at least some embodiments, BMC 1160 may manage information handling system 1100 even when information handling system 1100 is powered off or powered to a standby state. BMC 1160 may include a processor, memory, an out-of-band network interface separate from and physically isolated from an in-band network interface of information handling system 1100, and/or other embedded information handling resources. In certain embodiments, BMC 1160 may include or may be an integral part of a remote access controller (e.g., a Dell Remote Access Controller or Integrated Dell Remote Access Controller) or a chassis management controller.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

What is claimed is:

1. An information handling system, comprising:

a processor; and a chassis assembly comprising:

a chassis for enclosing components of the information handling system, wherein the chassis defines a plurality of add-in card (AIC) bays, wherein each of the AIC bays is configured to accommodate a first AIC having a first form factor;

a sleeve adapter comprising a sleeve adapter shell, wherein the sleeve adapter shell comprises two or more adapted bays including a first adapted bay and a second adapted bay, wherein the first adapted bay and the second adapted bay are each configured to accommodate a second AIC having a second form factor, wherein the first form factor and the second form factor are distinct form factors;

wherein the sleeve adapter is configured to insert into each of the AIC bays such that an AIC bay in which the sleeve adapter is inserted is configured to accommodate the second AIC having the second form factor;

wherein each of the AIC bays is configured to receive a first type of AIC connector suitable for connecting to a first plurality of data signals; and the sleeve adapter is configured to provide a first subset of the first plurality of data signals to the first adapted bay and a second subset of the first plurality of data signals to the second adapted bay.

2. The information handling system of claim 1, wherein the sleeve adapter is configured to receive a second type of AIC connector suitable for connecting to one of the first subset or the second subset of the first plurality of data signals.

3. The information handling system of claim 2, wherein the sleeve adapter routes signals connected to contacts of the first type of AIC connector to corresponding contacts of the second type of AIC connector.

4. The information handling system of claim 1, wherein:

the first form factor comprises an Enterprise and Data Center Standard Form Factor (EDSFF) E5 2T form factor.

5. The information handling system of claim 4, wherein:

the second form factor is selected from:

an EDSFF E5 1T form factor;

an EDSFF E3 form factor; and a card electromechanical (CEM) form factor.

6. The information handling system of claim 4, wherein the second form factor is selected from:

a low profile (LP) CEM form factor; and a full height half length (FHHL) CEM form factor.

7. A chassis assembly, comprising:

a chassis for enclosing components of an information handling system, wherein the chassis defines a plurality of add-in card (AIC) bays, wherein each of the AIC bays is configured to accommodate a first AIC having a first form factor;

a sleeve adapter comprising a sleeve adapter shell, wherein the sleeve adapter shell comprises, two or more adapted bays including a first adapted bay and a second adapted bay, wherein the first adapted bay and the second adapted bay are each configured to accommodate a second AIC having a second form factor, wherein the first form factor and the second form factor are distinct form factors;

wherein the sleeve adapter is configured to insert into each of the AIC bays such that an AIC bay in which the sleeve adapter is inserted is configured to accommodate the second AIC having the second form factor;

wherein each of the AIC bays is configured to receive a first type of AIC connector suitable for connecting to a first plurality of data signals; and the sleeve adapter is configured to provide a first subset of the first plurality of data signals to the first adapted bay and a second subset of the first plurality of data signals to the second adapted bay.

8. The chassis assembly of claim 7, wherein the sleeve adapter is configured to receive a second type of AIC connector suitable for connecting to one of the first subset or the second subset of the first plurality of data signals.

9. The chassis assembly of claim 8, wherein the sleeve adapter routes signals connected to contacts of the first type of AIC connector to corresponding contacts of the second type of AIC connector.

10. The chassis assembly of claim 7, wherein:

the first form factor comprises an Enterprise and Data Center Standard Form Factor (EDSFF) E5 2T form factor.

11. The chassis assembly of claim 10, wherein:

the second form factor is selected from:

an EDSFF E5 1T form factor;

an EDSFF E3 form factor; and a card electromechanical (CEM) form factor.

12. The chassis assembly of claim 10, wherein the second form factor is selected from:

a low profile (LP) CEM form factor; and a full height half length (FHHL) CEM form factor.

13. A sleeve adapter, comprising:

a sleeve adapter shell configured to insert into each of a plurality of add-in card (AIC) bays defined by a chassis of an information handling system, wherein each AIC bay is configured to accommodate a first AIC having a first form factor, wherein the sleeve adapter shell comprises two or more adapted bays including a first adapted bay and a second adapted bay, wherein the first adapted bay and the second adapted bay are each configured to accommodate a second AIC having a second form factor, wherein the first form factor and the second form factor are distinct form factors;

wherein each of the AIC bays is configured to receive a first type of AIC connector suitable for connecting to a first plurality of data signals; and the sleeve adapter is configured to provide a first subset of the first plurality of data signals to the first adapted bay and a second subset of the first plurality of data signals to the second adapted bay.

14. The sleeve adapter of claim 13, wherein the sleeve adapter is configured to receive a second type of AIC connector suitable for connecting to one of the first subset or the second subset of the first plurality of data signals.

15. The sleeve adapter of claim 14, wherein the sleeve adapter routes signals connected to contacts of the first type of AIC connector to corresponding contacts of the second type of AIC connector.

16. The sleeve adapter of claim 13, wherein:

the first form factor comprises an Enterprise and Data Center Standard Form Factor (EDSFF) E5 2T form factor.

17. The sleeve adapter of claim 16, wherein:

the second form factor is selected from:

an EDSFF E5 1T form factor;

an EDSFF E3 form factor; and a card electromechanical (CEM) form factor.

18. The sleeve adapter of claim 16, wherein the second form factor is selected from:

a low profile (LP) CEM form factor; and a full height half length (FHHL) CEM form factor.

* * * * *